(12) United States Patent
Witter

(10) Patent No.: US 7,824,457 B2
(45) Date of Patent: Nov. 2, 2010

(54) PORTABLE CYCLONIC DUST COLLECTOR

(76) Inventor: Robert M. Witter, 150 Robinnau Rd., Syracuse, NY (US) 13207

( * ) Notice: Subject to any disclaimer, the term of this patent is extended or adjusted under 35 U.S.C. 154(b) by 58 days.

(21) Appl. No.: 12/395,744

(22) Filed: Mar. 2, 2009

(65) Prior Publication Data

US 2010/0218467 A1 Sep. 2, 2010

(51) Int. Cl.
*B01D 50/00* (2006.01)
(52) U.S. Cl. .............................. 55/337; 55/437; 55/295; 55/438; 55/439; 55/460; 55/385.1; 55/385.2; 55/344; 55/356; 55/358; 55/470; 55/471; 55/459.1; 55/DIG. 18; 55/DIG. 3; 210/512.1; 210/512.3; 417/234; 15/320; 15/329; 15/323; 15/353; 15/347
(58) Field of Classification Search ................... 55/437, 55/438, 439, 295, 460, 377, DIG. 18, DIG. 3, 55/385.1–385.2, 342, 344, 356–358, 428, 55/431, 467, 470–471, 459.1; 210/512.1, 210/512.3; 15/320–321, 329, 323, 246.2, 15/353, 347; 417/234; 95/271
See application file for complete search history.

(56) References Cited

U.S. PATENT DOCUMENTS

| | | | | |
|---|---|---|---|---|
| 3,487,607 A | * | 1/1970 | Cox | ............................ 96/237 |
| 3,955,236 A | * | 5/1976 | Mekelburg | .................... 15/314 |
| 6,833,016 B2 | * | 12/2004 | Witter | ......................... 55/337 |
| 7,282,074 B1 | * | 10/2007 | Witter | ......................... 55/300 |
| 2007/0251198 A1 | * | 11/2007 | Witter | ......................... 55/300 |
| 2008/0016830 A1 | * | 1/2008 | Witter | ......................... 55/337 |

* cited by examiner

*Primary Examiner*—Jason M Greene
*Assistant Examiner*—Dung Bui
(74) *Attorney, Agent, or Firm*—Bernhard P. Molldrem, Jr.

(57) ABSTRACT

A portable dust collector for woodshop or other use with portable tools has a conic body that is supported on a tripod carriage formed of three legs attaching to gussets at the sides of the conic body. A divider plate within the conic body divides it into a cyclonic chamber between the divider plate and the lower nose, and a fan chamber between the divider plate and a motor plate that closes the upper mouth of the conic body. A final filter cartridge is fitted onto the outlet pipe, so that the dust collector exhausts clean, filtered air into the ambient. The final filter may be supported from a 90-degree elbow, with a removable tray for catching process dust that is knocked off the interior of the filter. The process dust in the cyclone settles into a dust collection barrel supported on a barrel cradle.

16 Claims, 4 Drawing Sheets

PORTABLE CYCLONIC DUST COLLECTOR

BACKGROUND OF THE INVENTION

This invention is directed to devices and equipment for collecting bulk solids, for example, process dust coming from a dust generating tool, such as a sanding machine, saw, router, planer or the like, where the dust is entrained in a flow of air from the source machine, and is separated out at the dust collection equipment, where the dust precipitates into a bag, drum, barrel, or other container. The invention is more specifically directed to a compact and efficient device to be used to separate and collect the dust from the air stream emerging from the tool, and to clean and filter the air stream which is then returned to the ambient. The invention is likewise concerned with a simple and straightforward portable dust separation assembly that can be rolled into place, and then can be coupled with a flexible duct to a saw, sander, or other dust producing tool, from which the air stream plus the entrained dust particles proceed.

For many types of machines for processing a workpiece, some mechanism is needed to dispense with the grindings, chips, and particulate matter that is generated by the machine during operation. For example, in the case of wood working machines, such as saws, planers, sanders, joiners, and the like, wood dust that is removed from a workpiece has to be collected and removed from the work area so as to avoid creating either a breathing hazard or a fire hazard. More specifically, in the case of portable equipment, e.g., portable table saws, portable sanders and buffers, it is conventional to draw off the dust that is generated by the machines and then send the air that is carrying the dust into a filter bag arrangement, or to draw off the dust through a flexible hose or conduit. In such case, the conduit or hose extends from a dust outlet duct of the machine to a dust collection station. In the case of smaller equipment, e.g., palm sanders or trim sanders, the stream of air is pumped through a flexible hose conduit, with the entrained process dust, to a piece of equipment that provides suction and some filtering, e.g., a shop vacuum. The same problem of environmental dust arises in metal working and ceramics also. In some cases involving organic materials and some types of ceramics, the process dust can be toxic or an environmental hazard, and has to be contained and kept from ambient breathing air.

A number of portable dust collectors for woodshop use have been proposed, which are typically known as single-stage dust collectors because they are intended to pull the dust, shavings and chips from a woodworking machine through an impeller in a single pass. In the typical example of a portable dust collector, a hose connects the collector to a dust outlet of the machine, and an air stream travels though this, with entrained dust, chips, and other particles, to the blower or impeller. The impeller, which is typically driven by a 1.5 HP 110 volt AC induction motor, moves the air flow through a tubular conduit to a cylinder that is open on its top and bottom. A lower bag of a plastic film, which may include reinforcement, is disposed below the cylinder to capture large chips and shavings. Above the cylinder is a filter bag, which is intended to catch the fine dust particles and let the air flow pass through. A cartridge filter can be substituted where it is desired to trap particles down to one micron diameter. The entire unit is typically mounted on a base, e.g., a cart or platform, with wheels, rollers or casters so that the unit can be moved around the shop from one machine to another.

Because of the design, only about half the dust that is produced is separated out and falls into the lower bag, and the rest goes up to the upper filter. The upper filter tends to blind or clog after a limited operation time, which reduces the efficiency of the unit.

Also, a typical woodworking machine, such as a planer, joiner or table saw, requires an air flow of about 400 to 800 cfm to pick up all the generated dust in the air stream, and this is also the maximum air flow that these existing portable dust collector units can produce in normal operation.

A portable dust collection unit that is based on a cyclonic dust collection system, in which the air flow and entrained process dust are drawn through a cyclone separator, is described in U.S. patent application Ser. No. 11/489,182, i.e., Pat. Appln. Pub. No. US 2008/0016830, which was the first use of a true cyclonic separator as a dust separation and collection device between the dust producing tool and the portion of the unit where the air is filtered and returned to the ambient.

Yet even this unit is somewhat cumbersome and complex, especially for uses where the machine has to be moved with a smaller portable tool such as a portable circular saw or sander.

OBJECTS AND SUMMARY OF THE INVENTION

Accordingly, it is an object of this invention to provide an efficient portable dust collection arrangement that is well suited for portable use, which has a simple and efficient design, and which avoids drawbacks of the prior art.

It is a more specific object to provide a dust collection arrangement that can be used in line with the dust producing tool and which uses a true cyclonic chamber to separate out between 95% and 99% of the dust entrained in the air stream emerging from the tool.

It is another object to provide a portable dust collection that is simple and straightforward in construction, cost-effective, highly reliable, and adaptable to a wide range of tools.

It is yet another object to provide a dust collection system that deposits the dust particles into a conventional drum or dust barrel, or the equivalent, so that the dust can be removed and disposed of easily.

A further object is to provide a dust collection system of improved airflow design, so that its efficiency is increased and the level of process noise is decreased in respect to state-of-art portable dust collector units.

According to an aspect of the invention, a portable woodshop dust collection unit has an overall conic body having a conic wall, and upper motor plate closing off a wide upper end of said conic wall, and a narrow nose at a lower end of the conic wall. There is a horizontal divider plate affixed within the conic body and this divider plate defines above it a mechanical fan chamber (between the divider plate and the motor plate), and defines below it a cyclonic chamber (between the divider plate and the narrow nose of the conic body). The divider plate has a central passage, and the vortex tube is mounted here and descends from the central passage into the cyclonic chamber. This construction allows the cyclone separator and the blower to be located within the same, single conic body. A purely conic body structure yields higher efficiency of particle separation over a classic cylinder+cone design, while decreasing construction costs.

An air inlet conduit penetrates the conic wall below the divider plate and it is through this conduit that the exhaust air and entrained dust from the tool are introduced into the cyclonic chamber.

The dust collection drum or barrel is positioned directly below the nose of the conic body. A generally flat disk-type lid closes off the top of the dust collection barrel. This can be clamped to the rim of the barrel, so that air does not leak into the barrel from the ambient. The lid has a dust inlet opening, and a tubular boot is positioned on the lid at this dust inlet opening for coupling the nose of the conic body to the inlet opening of the lid. The dust that is separated from the air flow in the cyclonic chamber drops from the nose, through the boot, into the dust collection barrel.

A fan is disposed in the mechanical fan chamber and this fan serves to induce the air flow from the air inlet conduit, into the cyclonic chamber, and through the vortex tube into the mechanical fan chamber. An air outlet duct penetrates the conic wall at the mechanical fan chamber, and exhaust air is conducted through this outlet duct from mechanical fan chamber to a final filter. Favorably, the final filter cartridge includes a cylindrical cartridge filter, such as a HEPA filter. The final filter cartridge can be disposed horizontally and held on a plate that seals against the outlet duct. The mount for the filter can employ a threaded post extending horizontally from said outlet duct, and a nut threadably mounted on said post for removably securing the final filter cartridge thereon.

An alternative final filter arrangement employs a 90-degree elbow at the outlet duct to position the filter cartridge vertically downward. Dust that collects on the inside of the filter can be blown down e.g. by using an air hose or by using an internal pleat paddle system. The dust falls into a removable collection tray at the base of the filter. In this arrangement, the filter cartridge can be cleaned without the need to remove it from the machine.

Favorably, there is a flat mounting ring affixed, i.e., welded at inner inner periphery of the wide upper end of the conic wall, and the fan motor plate rests atop this mounting ring. There can be threaded posts extending up, through openings in the rim of the fan motor plate, so the motor plate can be bolted down, with a seal gland or gasket between the motor plate and the mounting ring.

The fan includes a centrifugal fan rotor that is mounted on a vertical shaft, which extends down below the motor plate. In a preferred arrangement, the fan rotor can be a blower impeller with rear-inclined (or backward curved) radial vanes, for higher efficiency and lower noise level. The rearward curved vanes can extend from a position corresponding to the wall of the vortex tube to a radial position that corresponds with inner edge of the mounting ring. A volute or stator baffle can be used in the mechanical fan chamber to increase vacuum draw and improve efficiency.

In a preferred arrangement, a tripod support can be used, in which a plurality of support legs support the conic body above the floor surface. In that case, there are dihedral support gussets on the outside of the conic body, and socket member affixed in the bend of the dihedral gussets, into which upper ends of the legs are attached. Foot members at the lower end of the legs rest on the floor surface. These foot members can include wheels and/or casters to facilitate rolling the dust collection arrangement into the desired location.

In preferred embodiments, the boot that conducts the dust from the conic body to the dust collection barrel can be in the form of a flexible tubular member, i.e., rubber or a flexible plastic, with a lower flange that supported on the lid of dust barrel, and a generally radially inward-directed or stepped portion at or near its upper end. The nose at the narrow, lower end of the conic body has a radial flange, and the tubular member fits onto the nose above that flange, with the radially inward directed portion resting on the flange. An annular clamp, which can be a standard hose clamp, or even a cable tie, secures the upper part of said tubular member to the nose of the conic body above the nose flange.

A drum support cradle may be attached to a lower part of the tripod or support legs. The drum support cradle passes below an underside of dust collection barrel to hold the latter off a floor surface, so the drum is kept in place when the dust collection arrangement is rolled along. The support cradle can take the form of rods, each rod having one end shaped to fit into a receptacle in respective one of the support legs. The other ends of the rods may be intertwined with one another beneath said dust collection barrel. In a preferred embodiment, the drum cradle may be a tray that is generally triangular, with its respective corners affixed to each of the tripod legs.

There can be a quick disconnect fitting on the intake tube for attaching a flexible hose leading from a dust-producing tool.

The terms "drum" and "barrel" as used here are not intended to limit the invention to a traditional, generally cylindrical rigid barrel, but can include many equivalent containers for receiving and holding the precipitated wood dust or other process dust. In some embodiments, a plastic bag formed of an extruded plastic film, e.g., polyethylene or vinyl can be used, e.g., a poly bag or liner. This may be supported in a frame or cage, but such support structure would be optional. Where there is a negative system pressure, the frame would include some means for preventing the bag or film from collapsing.

Favorably, the cylindrical cyclonic chamber can be have a baffle or neutral vane at the intake duct leading to the vortex tube. This baffle or neutral vane is intended to extend inward into the cyclone, protecting the incoming air flow from being affected by the airflow that is traveling around the center vortex tube. That is, the neutral vane blocks air that would otherwise have wrapped around the vortex tube, and directs this airflow downwards. The neutral vane keeps the air flow as laminar as possible, leading to more efficient and quieter operation. There can be a small gap between the neutral vane and the vortex tube, so that larger particles do not collect here, but will fall down into the drum or barrel. The size of the gap can be selected to optimize the efficiency gain of the air flow.

The above and many other objects, features, and advantages of this invention will become apparent from the ensuing detailed description of the preferred embodiments, which is illustrated in the accompanying Drawing.

DETAILED DESCRIPTION OF A PREFERRED EMBODIMENT

Figure 1:
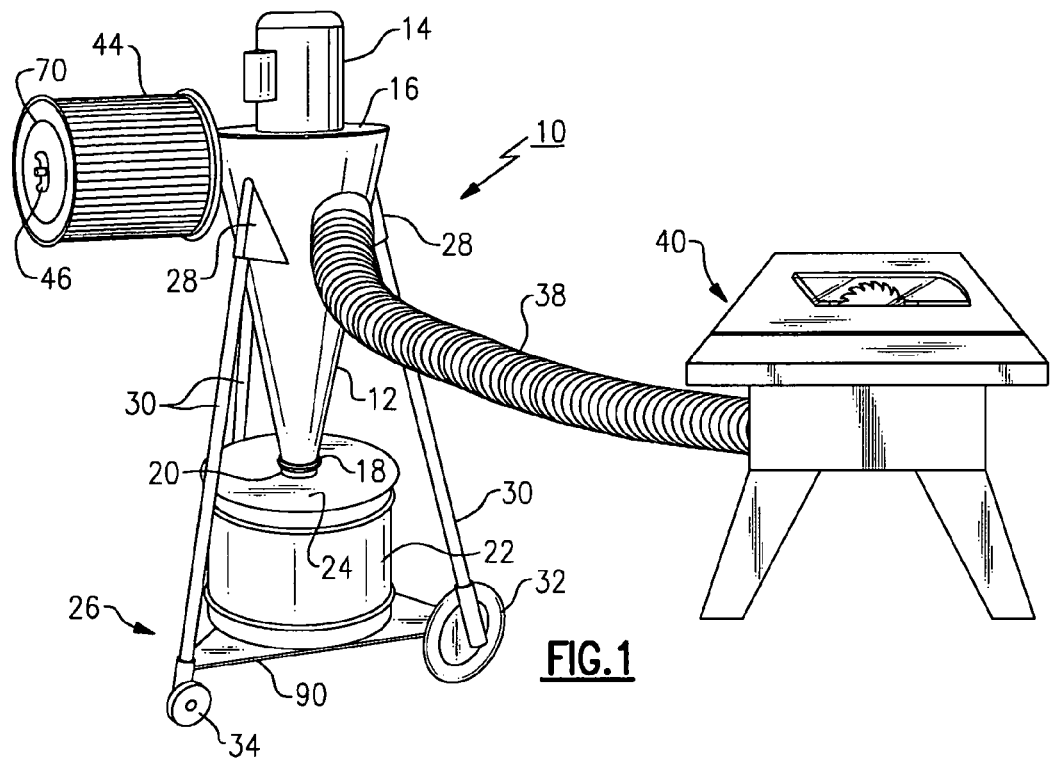
FIG. 1 is a perspective system view of a portable cyclonic dust collector according to one embodiment of this invention.

Now with reference to the Drawing, FIG. 1 shows a woodshop application, in which a portable dust collection device 10, according to an embodiment of the present invention is coupled to a flexible duct or hose to receive an airflow containing entrained wood process dust from a saw, sander, or other woodworking machine, in this example, a portable table saw.

As illustrated here, the dust collector device 10 has a conic body 12, with a motor 14 positioned on a motor plate 16, e.g., a flat metal disk, that is mounted on the wide upper mouth of the conic body 12. A narrow, lower nose 18 of the conic body is connected by a dust conduit 20 to a dust collection barrel or drum 22 that is located immediately beneath the nose 18 of the conic body. The conduit 20 leads to a central opening of a barrel lid 24, which is in the form of a flat disk that covers the open mouth of the barrel 22, and closes it off. There are clamps and seals (not shown) to make an air tight seal between the mouth of the barrel 22 and the lid 24.

The conic body 12 is supported on a tripod cart 26. Here, there are three dihedral gussets 28 affixed at positions about the outer wall of the conic body 12, spaced 120 degree apart from each other. Tubular legs 30 are respectively fitted into these gussets 28. A pair of wheels 32 are supported on a transverse axle that extends between two of the legs, and a caster 34 is positioned on the remaining leg 30. These permit the dust collector to be easily rolled into place as desired, to be positioned next to the portable dust producing tool. The wheels and caster can be locked, so that once in place the dust collector does not roll away.

Figure 2:
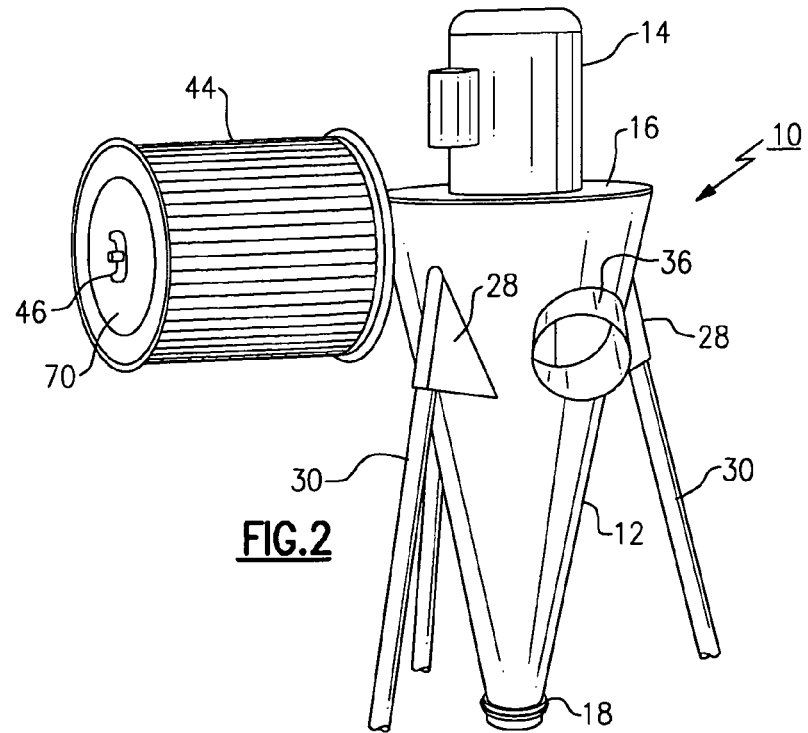
FIG. 2 is an enlargement of the cyclonic body, motor, motor plate, and final filter thereof.

As shown in FIGS. 1 and 2, there is an inlet pipe 36, e.g., of a nominal 4-inch diameter, that leads into the conic body 12. This inlet pipe 36 accepts an elongated flexible conduit or hose 38 that receives an air stream from the tool, e.g., a table saw 40, with the air stream containing entrained dust particles. An exhaust pipe 42 (see FIG. 3) leads from the conic body to exhaust the air stream through a filter cartridge 44 into the ambient. A screw-on or twist-on retainer 46 holds the filter cartridge 44 in place, and will be described later.

In these drawing views, the electrical power cord and control switch box are omitted for the sake of drawing simplicity, but would be incorporated in known fashion on any practical embodiment.

Figure 3:
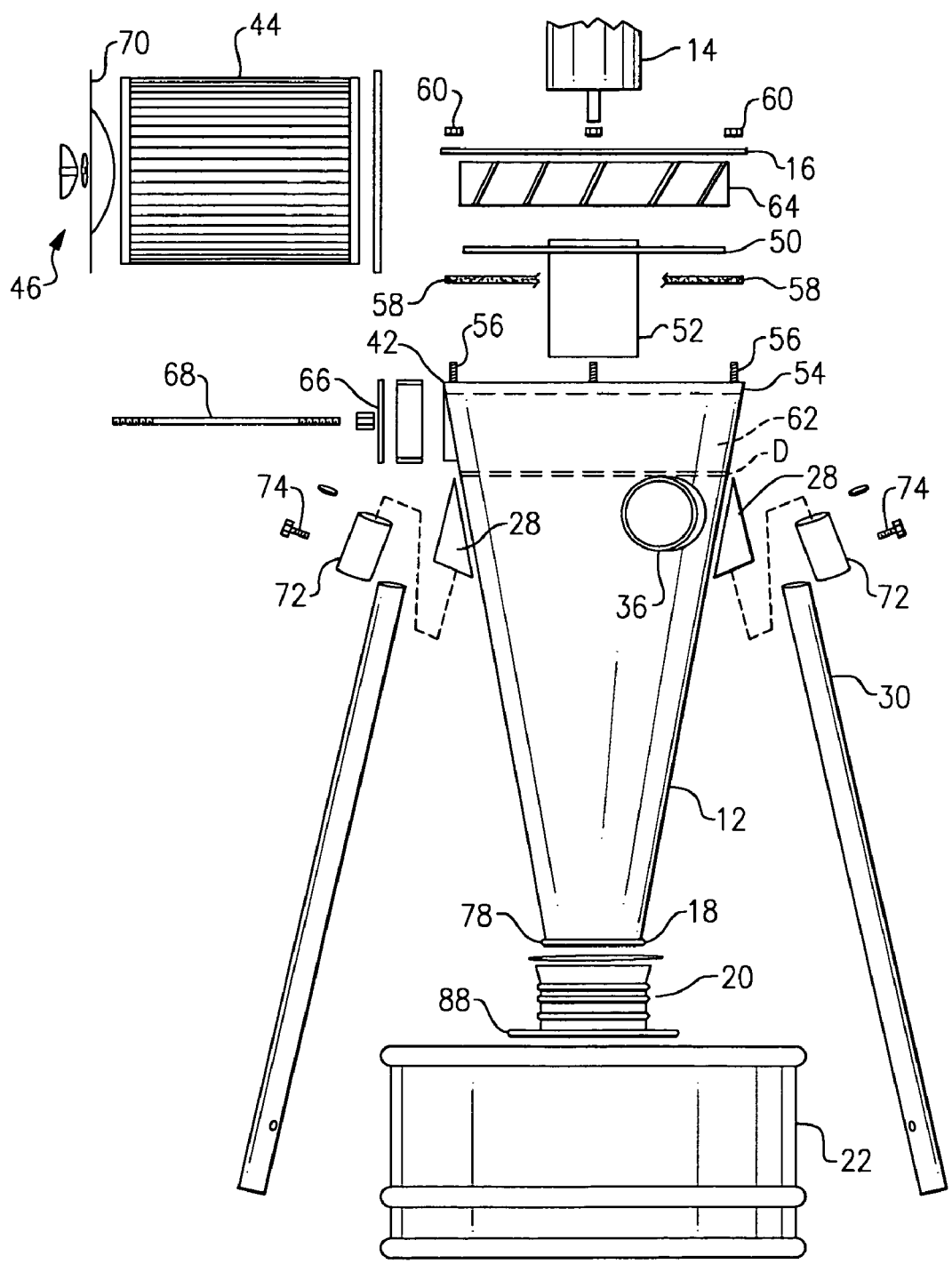
FIG. 3 is an exploded assembly view thereof.

The construction of the portable cyclonic dust collector 10 is shown in detail in the exploded assembly view of FIG. 3.

As seen in FIG. 3, a divider plate 50, i.e., a flat disk with a central opening, is affixed within the conic body at a location D, as indicated with dash lines. A vortex tube 52, i.e., a vertical pipe, is supported at the central opening in the divider plate 50, and extends downward into the conical space beneath the divider plate.

The inlet pipe 36 injects the air stream into the space just below the divider plate 50, such that the conic space between the divider plate 50 and the nose 18 forms a cyclonic chamber.

A mounting ring 54 is affixed in place at the inner surface of the upper mouth of the conic body 12 and this has a number of vertical threaded posts or studs 56 that serve for holding down the motor plate 16. A ring seal or gland 58, formed of an elastomeric sealing material, is positioned atop the ring 54 to form an air-tight seal at the circular edge where the motor plate 16 meets the mouth of the conic body 12. Finally, there are nuts 60 that thread onto the posts 56 to secure the motor plate.

The divider plate 50 can be spot welded at a number of spaced locations at the position D, to secure the plate in position, and the juncture of the divider plate 50 with the interior wall of the conic body 12 can be sealed with a suitable caulk or sealing agent. Likewise, the upper sealing ring 54 can be spot welded and then sealed with a suitable caulk or sealing agent.

A blower space 62 is defined between the divider plate 50 and the motor plate 16 above it, and a fan or blower impeller 64 is mounted on the shaft of the motor 14 and occupies this blower space 62. The exhaust pipe 42 is located on the conic body 12 at this level, so that the exhaust pipe 42, and filter cartridge 44, communicate with the blower space 62 and receive the exhaust air flow therefrom. In a preferred embodiment, the impeller 64 has back curved blades or vanes. An optional stator baffle, not shown here, can occupy a portion of the peripheral wall in the blower space to increase efficiency and/or to reduce fan noise.

At the upper left in FIG. 3 is shown the mount for holding the cartridge filter 44 in place on the exhaust pipe 42. In this embodiment, a spider 66, i.e., a device with arms that span across the diameter of the exhaust pipe, has a threaded central socket, and this socket retains a threaded rod 68. In this embodiment, the rod 68 extends out along the axis of the exhaust pipe 42. A filter retaining plate 70 fits over the distal end of the filter cartridge, and is held down by the twist-on retainer 46, i.e., a hand-tightened screw device, that mates with the threads on the rod 68. The filter cartridge 44 can be quickly removed, when need be, to knock loose dust from it, and/or to replace it with a fresh cartridge 44.

As shown also in FIG. 3, the dihedral gussets 28 which are associated with the respective tripod legs 30 each incorporate a tubular socket 72 that is affixed to the inside angle of the gusset 28. The sockets 72 have an inside diameter slightly greater than the diameter of the tubular legs. The tubular wall of each of the sockets has a threaded bore to receive a respective set screw 74 that holds the associated leg in place. Each gusset 28 has two edges that are welded onto the conic body 12.

Figure 4:
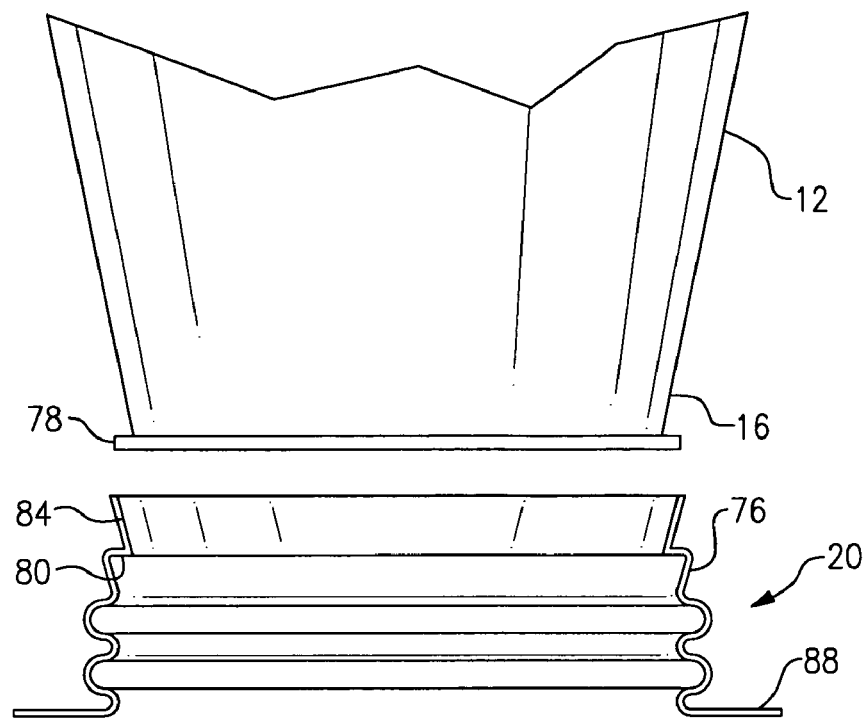
FIG. 4 is a cross sectional detail view of the lower nose portion and the dust conduit boot of this embodiment.
Figure 5:
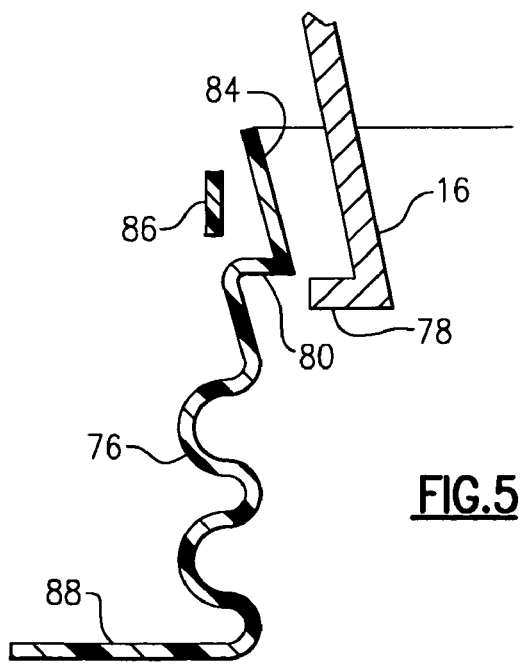
FIG. 5 is a detailed view of features in FIG. 4.

The lower dust conduit 20 of this embodiment may be in the form of a boot 76 formed of a flexible plastic material, and is provided with accordion folds or bellows, as shown in detail in FIGS. 4 and 5. The lower nose 18 of the conic body 12 has a ring flange 78 that projects out horizontally a short distance. A flat, horizontal interior ring portion 80 of the boot 76 then seats onto the ring flange 78. Above this flat ring portion 80 is a conic portion 84 of the boot that mates against the conic outer side of the body 12 at the nose 18. An annular strap or clamp 86 then secures the boot 76 to the nose 18 of the conic body. This should make an air-tight seal, to prevent air leakage into the conduit. The strap or clamp 86 may be a cable tie, a hose clamp, or other similar known device.

At the lower end of the boot 76 is an annular flange 88 that can be secured to the barrel lid 24. This may be secured by threaded fasteners, ow with a suitable cement.

As shown in FIG. 1, below the barrel, there may be a generally triangular tray 90 affixed onto the legs 30, serving as a drum cradle for supporting the dust collection barrel 22, and which may also serve to provide mutual reinforcement between the lower ends of the three legs 30.

The inlet pipe 36 passes through the conic wall of the conic body 12 just beneath the location D of the divider plate 50. The air stream enters here, below the divider plate, and passes around the vortex tube 52 forming a spiral flow that separates out the entrained dust, which falls out the nose 18 into the dust collection barrel 22. The air then leaves up through the vortex tube 52 into the blower space 62, where the impeller 64 moves the air stream out the exhaust pipe 42 and through the filter cartridge 44 so that the air returns to the ambient as dust-free, clean, filtered air. While not shown here, there may be an internal baffle or neutral vane in the space where the air flow passes from the inlet pipe 36 and flows around the vortex tube 52.

A polyethylene bag liner may optionally be used in the drum or barrel to facilitate disposal of the collected dust. If so, a vacuum hold down feature may be employed. So long as there is a positive pressure in the cyclone system, a flexible bag can be used to collect the dust that precipitates from the cyclones, rather than a rigid drum. In that case, a frame or cage can be used to help support the bag, which may be of polyethylene or another plastic film.

A silencer sleeve or insert (not shown) can be used with this cyclonic dust collector in a wood shop environment. The silencer may comprise a sleeve of acoustic foam that can be fitted inside the filter cartridge 44 to absorb some of the process noise or blower noise.

A deflector plate (not shown) may be suspended a few inches beneath the opening in the barrel lid 24 where the dust enters the dust collection barrel 22. This may help keep upward eddy currents from re-introducing the process dust back into the cyclone, i.e., to help reduce "eddying" from the drum up into the cyclone. A deflector plate used in this fashion does not adversely affect the cyclonic separation function. Similarly, a deflector plate (not shown) may be used beneath the lower end of the vortex tube 52 to prevent eddying up of dust into the blower chamber.

Figure 6:
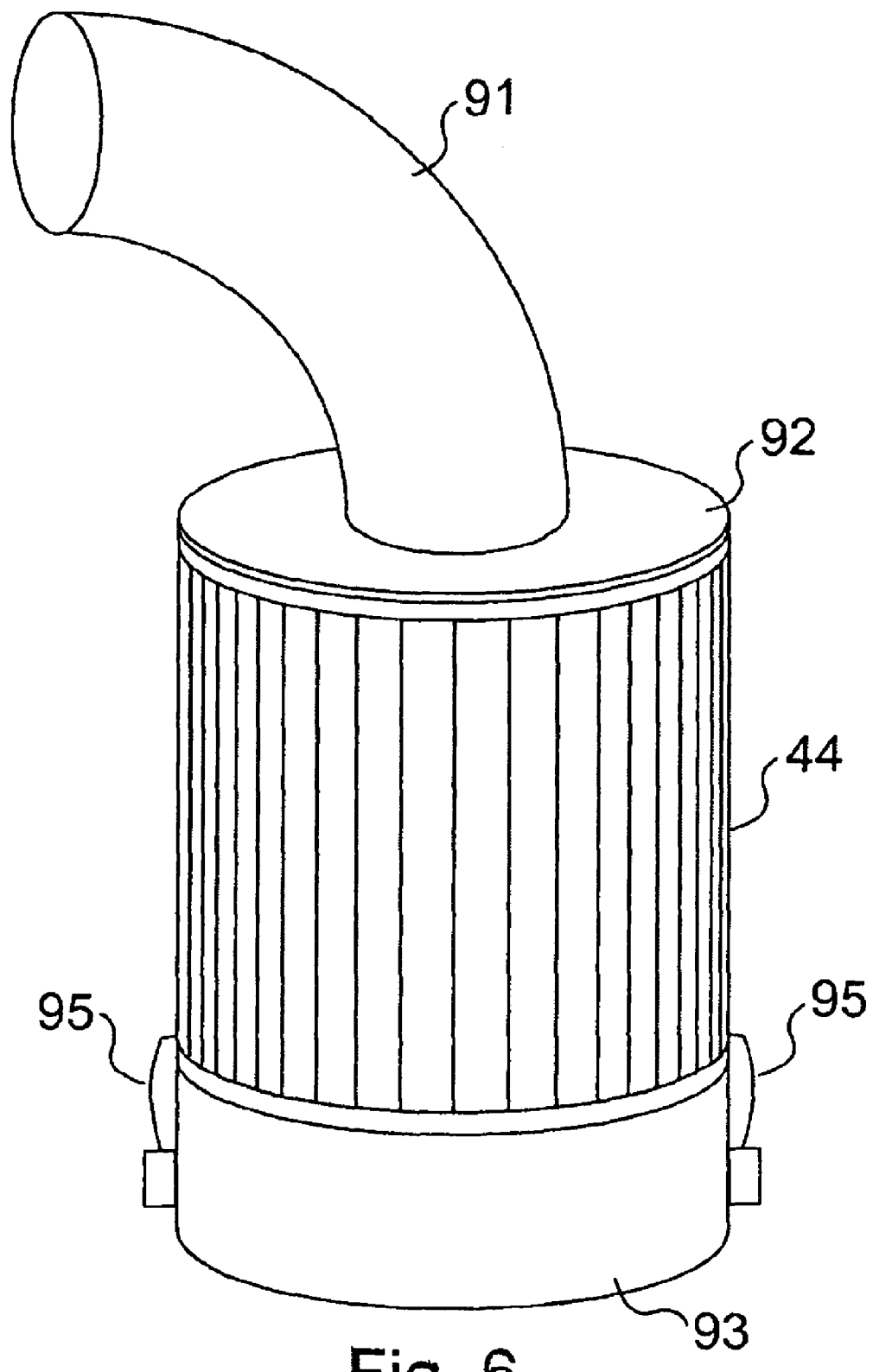
FIG. 6 shows an alternative arrangement of the final filter with 90° elbow.

FIG. 6 illustrates an alternative arrangement in respect to the final filter, e.g., filter cartridge 44. Here, a ninety-degree elbow pipe 91 is affixed at one end to the exhaust pipe 42 (not shown in this view), and ends at a circular upper plate 92 onto at the upper end of the filter 44. There is a lower cup 93 closing off the lower end of the filter 44, and the upper and lower members 92 and 93 can be joined to one another in much the same way as the corresponding elements of FIG. 3. Here, the lower cup 93 has a removable tray 95, which collects particles that fall from the inner pleats of the filter cartridge 44, and can be pulled out from the cup 93 to empty. The larger dust particles that accumulate on the inner surfaces of the filter cartridge can be knocked free mechanically, or blown free using a compressed air hose against the outside of the filter. With this arrangement, the filter cartridge can be cleaned periodically without the need to remove it from the machine.

The unification of the cyclone and blower into a single conic body allows for economic construction of the dust collector device. There is no separate cylindrical "barrel" portion of the cyclone, which would require welding of a long, circular seam. Also, this design exhibits an improvement of 12% to 20% increase in particle separation, as compared with the classical cylinder+cone design. Moreover, because the fan or blower chamber is formed in the conic body, a number of separate manufacturing and assembly steps are avoided. In some embodiments, a cylindrical neck can be added to extend down from the nose, or a cylindrical portion can be added to the top of the conic body, without changing the principles of construction or operation.

The dust collector 10 has a relatively low profile, and may be only about 62 inches tall, with a footprint of about three feet by three feet. With the motor 14 being a single-phase 1.5 HP (8 A at 220 VAC or 16 A at 110 VAC), unit has a system performance of 650 cfm, yet has quiet operation, and high-efficiency dust separation. A remote starter can start the current to the motor 14 when the associated tool 40 is turned on. The unit is can be assembled or disassembled in under 15 minutes.

While the invention has been described hereinabove with reference to a selected preferred embodiment, it should be apparent that the invention is not limited to such embodiment. Rather, many variations would be apparent to persons of skill in the art without departing from the scope and spirit of this invention, as defined in the appended Claims.

I claim:

1. A portable cyclonic dust collection arrangement, comprising;
    a conic body having a conic wall, an upper motor plate closing off a wide upper end of said conic wall, and a narrow nose at a lower end of the conic wall;
    a horizontal divider plate affixed within said conic body and defining a mechanical fan chamber between the divider plate and the motor plate, and defining a cyclonic chamber between the divider plate and the nose of the conic body, the divider plate having a central passage, and a vortex tube descending from said central passage into the cyclonic chamber;
    an air inlet conduit penetrating said conic wall below said divider plate and adapted to introduce into said cyclonic chamber a flow of air entraining dust received from a dust-generating source;
    a dust barrel positioned below said nose and having a lid closing off a top of the dust barrel, the lid having a dust inlet opening;
    a tubular boot coupling the nose of the conic body to the inlet opening of the lid such that dust separated in the cyclonic chamber from said flow of air drops from said nose, through said boot, into the dust collection barrel;
    a fan disposed in said mechanical fan chamber and adapted to induce said air flow from said air inlet conduit, into said cyclonic chamber, and through the vortex tube into the mechanical fan chamber; and
    an air outlet duct penetrating the conic wall at said mechanical fan chamber, and adapted to conduct said flow of air from said fan chamber to a final filter.

2. The cyclonic dust collection arrangement according to claim 1 wherein said final filter cartridge includes a cylindrical cartridge filter.

3. The cyclonic dust collection arrangement according to claim 2 comprising means securing the final filter cartridge sealably against said air outlet duct.

4. The cyclonic dust collection arrangement according to claim 3, wherein said means securing the final filter cartridge includes a 90-degree elbow supporting said final filter cartridge vertically.

5. The cyclonic dust collection arrangement according to claim 4, further including a removable tray situated below said final filter cartridge to collect dust particles that fall from an interior surface of the final filter cartridge, so that the cartridge can be cleaned without having to remove it.

6. The cyclonic dust collection arrangement according to claim 3 wherein said means for securing further includes a threaded post extending along a horizontal axis of said outlet duct, and a screw-on retainer threadably mounted on said post for removably securing the final filter cartridge thereon.

7. The cyclonic dust collection arrangement according to claim 1 wherein said conic body includes a mounting ring affixed at an inner periphery of the wide upper end of said conic wall, and with said fan motor plate resting atop said mounting ring.

8. The cyclonic dust collection arrangement according to claim 7 wherein fan includes an impeller mounted on a vertical axis of said motor that extends below said motor plate, and which has rearward curved vanes that extend from a position of said vortex tube to a radial position that corresponds with said mounting ring.

9. The cyclonic dust collection arrangement according to claim 1 comprising a plurality of support legs supporting said conic body above a floor surface, including support gussets on said conic body to which upper ends of said legs are attached, and foot members at the lower end of said legs resting on said floor surface.

10. The cyclonic dust collection arrangement according to claim 9 wherein said support gussets are in the form of dihedral members having a bend along which the upper end of the associated support leg is attached, and having a pair of edges that are affixed to an outer surface of said conic body.

11. The cyclonic dust collection arrangement according to claim 10 wherein said support gussets each include a tubular socket member affixed on an inner side of the bend of the dihedral member, adapted for receiving an upper end of the associated support leg.

12. The cyclonic dust collection arrangement according to claim 9 wherein at least some of said foot members include wheels mounted on said support legs.

13. The cyclonic dust collection arrangement according to claim 1 wherein said boot includes a flexible tubular member having a lower flange supported on the lid of said dust barrel, and a generally radially inward directed portion at an upper end; and wherein the nose of said conic body includes a radial flange, said tubular member fitting on said nose above said flange with said radially inward directed portion resting on said flange.

14. The cyclonic dust collection arrangement according to claim 13 further comprising an annular clamp securing an upper part of said tubular member to said nose above said flange.

15. The cyclonic dust collection arrangement according to claim 9 further comprising a drum support cradle that is attached to said support legs and which passes below an underside of said dust collection barrel to hold the latter off a floor surface.

16. The cyclonic dust collection arrangement according to claim 15 wherein said su/pport cradle includes a tray member fitting onto each of said support legs.

* * * * *

UNITED STATES PATENT AND TRADEMARK OFFICE
CERTIFICATE OF CORRECTION

| | |
|---|---|
| PATENT NO. | : 7,824,457 B2 |
| APPLICATION NO. | : 12/395744 |
| DATED | : November 2, 2010 |
| INVENTOR(S) | : Robert M. Witter |

It is certified that error appears in the above-identified patent and that said Letters Patent is hereby corrected as shown below:

Col. 10, Claim 16, line12:     "/" in the word 'support' should be deleted

Signed and Sealed this
First Day of February, 2011

David J. Kappos
*Director of the United States Patent and Trademark Office*